United States Patent
Grunkin et al.

(10) Patent No.: US 12,131,464 B2
(45) Date of Patent: Oct. 29, 2024

(54) SCANNING/PRE-SCANNING QUALITY CONTROL OF SLIDES

(71) Applicant: Visiopharm A/S, Hørsholm (DK)

(72) Inventors: Michael Grunkin, Skodsborg (DK); Johan Doré Hansen, Naerum (DK); Jeppe Thagaard, Copenhagen (DK)

(73) Assignee: Visiopharm A/S, Hørsholm (DK)

( * ) Notice: Subject to any disclaimer, the term of this patent is extended or adjusted under 35 U.S.C. 154(b) by 395 days.

(21) Appl. No.: 17/623,090

(22) PCT Filed: Jun. 26, 2020

(86) PCT No.: PCT/EP2020/068037
§ 371 (c)(1),
(2) Date: Dec. 27, 2021

(87) PCT Pub. No.: WO2020/260591
PCT Pub. Date: Dec. 30, 2020

(65) Prior Publication Data
US 2022/0260825 A1 Aug. 18, 2022

(30) Foreign Application Priority Data
Jun. 28, 2019 (EP) .................................. 19183338

(51) Int. Cl.
*G06N 20/00* (2019.01)
*G02B 21/34* (2006.01)
(Continued)

(52) U.S. Cl.
CPC ............ *G06T 7/0012* (2013.01); *G02B 21/34* (2013.01); *G02B 21/367* (2013.01);
(Continued)

(58) Field of Classification Search
CPC ........ G16H 30/40; G16H 50/30; G06N 20/00; G06N 3/08; G06T 7/0014; G06T 7/11; G06T 7/0012; G06T 15/04; G06K 9/0014
See application file for complete search history.

(56) References Cited

U.S. PATENT DOCUMENTS

2018/0012360 A1* 1/2018 Bredno ................. G06F 18/211
2019/0295252 A1* 9/2019 Fuchs ................... G06F 18/217

FOREIGN PATENT DOCUMENTS

WO 2016120418 A1 8/2016

OTHER PUBLICATIONS

European Search Report pertaining to Application No. 19183338.3 dated Jan. 24, 2020.
(Continued)

*Primary Examiner* — Phuoc H Doan
(74) *Attorney, Agent, or Firm* — DINSMORE & SHOHL LLP

(57) ABSTRACT

A method of analyzing a plurality of histology slides is provided, wherein possible artefacts are detected at an early stage. This is achieved by including a preliminary imaging and image analysis step in the process flow; the step being executed preferably before any diagnostic assessment e.g. image analysis or manual reading is performed by a pathologist or a lab technician. Accordingly, the histology slides reaching the expert for image analysis are of a higher quality, since the slides are ideally free of artefacts. The method thus saves valuable time for the pathologist, since only artefact-free slides will be subject to a detailed analysis. Furthermore, the method minimizes the risk of misinterpretations leading to potentially false diagnoses. A deep learning model, is also disclosed, which is capable of automatically determining whether histopathological images are suitable (Continued)

for diagnostic and/or research assessment. A training of the deep learning model is also disclosed.

8 Claims, 5 Drawing Sheets

(51) Int. Cl.
    *G02B 21/36*      (2006.01)
    *G06T 7/00*      (2017.01)
    *G06V 20/69*      (2022.01)

(52) U.S. Cl.
    CPC .. *G06V 20/695* (2022.01); *G06T 2207/10056* (2013.01); *G06T 2207/20081* (2013.01); *G06T 2207/20084* (2013.01); *G06T 2207/30024* (2013.01)

(56) References Cited

OTHER PUBLICATIONS

Ameisen et al., "Automatic Image Quality Assessment in Digital Pathology: From Idea to Implementation", Proceedings IWBBIO, pp. 148-157, Granada, Apr. 7-9, 2014.
Avanaki et al., "Automatic Image Quality Assessment for Digital Pathology", Springer International Publishing Switzerland, IWDM 2016, LNCS 9699, pp. 431-438, 2016.
Janowczyk et al., "HistoQC: an Open-Source Quality Control Tool for Digital Pathology Slides", JCO Clinical Cancer Informatics, American Society of Clinical Oncology, Apr. 1, 2019, 17 pages.
Senaras et al., "DeepFocus: Detection of out-of-focus regions in whole slide digital images using deep learning", Plos One, vol. 13, No. 10, Oct. 25, 2018.
Webster et al., "Whole-Slide Imaging and Automated Image Analysis: Considerations and Opportunities in the Practice of Pathology", Veterinary Pathology, vol. 51, No. 1, pp. 211-223, 2014.

\* cited by examiner

FIG. 1 - PRIOR ART

SCANNING/PRE-SCANNING QUALITY CONTROL OF SLIDES

CROSS-REFERENCE TO RELATED APPLICATIONS

This application is the U.S. National Stage of PCT/EP2020/068037 filed Jun. 26, 2020, which claims priority to European Patent Application No. 19183338.3, filed Jun. 28, 2019, the content of both are incorporated herein by reference in their entirety.

FIELD OF THE INVENTION

The present disclosure relates to a method for analysing a plurality of histology slides as well as a method for preparing histology slides for analysis, and, based on an image of at least part of the tissue specimen, determining whether the slides comprise one or more rejectable artefacts. The present disclosure further relates to a method for training a deep learning model to recognize said artefacts.

BACKGROUND OF INVENTION

Histopathology refers to the microscopic examination of tissue in order to study the manifestations of disease. In clinical medicine, histopathology refers to the examination of a biopsy or surgical specimen by a pathologist, after the specimen has been processed and histological sections have been placed onto glass slides.

Since biological tissue has little inherent contrast in either a light or electron microscope, staining is often employed to give both contrast to the tissue as well as highlighting particular features of interest. The histological slides are typically examined under a microscope by a pathologist, or images of the tissue are captured using a scanner and subsequently analysed.

Identification of structural and morphological details of tissue components is important for arriving at a conclusive diagnosis. However, sometimes the presence of certain artefacts in a microscopic section can result in misinterpretations leading to diagnostic pitfalls. An artefact can be defined as an artificial structure or tissue alteration on a prepared microscopic slide as a result of an extraneous factor. The artefacts may occur during surgical removal, fixation, tissue processing, embedding, microtomy, staining, or mounting procedures. Artefacts can even lead to complete uselessness of the tissue. It is therefore essential to identify the commonly occurring artefacts during histopathological interpretations of tissue sections.

Often the artefacts are not identified until a detailed examination or image analysis is performed by a pathologist or a lab technician. An artefact in the tissue specimen often means that the histology slide has to be discarded and a new one has to be ordered, replacing the slide with the specimen containing artefacts. Since the pathologist may have to examine a large number of histology slides, any number of slides containing artefacts rendering the sample useless, results in additional work that could have been avoided, provided the artefacts had been detected at an earlier step in the process. Performing a detailed image analysis of a plurality of histology slides is typically a very time-consuming process, and hence it is of interest to eliminate or at least minimize the number of useless slides, e.g. the ones containing artefacts, arriving at a pathologist for examination or analysis.

SUMMARY OF INVENTION

There is a need for detecting artefacts early in process flows relating to whole-slide digital diagnostics and image analysis of histology slides. Furthermore, there is a need to evaluate whether histology slides comprising one or more artefacts should be rejected before the slides proceed to imaging in a scanning system and before they are subject to a diagnostic assessment by image analysis and/or a pathologist. Such a detection and evaluation scheme can save valuable resources related to the analysis of histology slides. Additionally, there is a need for an automatic detection of artefacts in tissue specimens and an automatic evaluation of the potential rejection of histology slides containing artefacts.

The present disclosure addresses these issues by presenting a method of analyzing a plurality of histology slides, wherein possible artefacts are detected at an early stage. This is achieved by including a preliminary imaging and image analysis step in the process flow; the step being executed preferably before the slide is subject to further imaging in a scanning system, and before a typically more detailed image analysis is performed by a pathologist or a lab technician. Accordingly, the histology slides reaching the expert, e.g. a pathologist, for analysis at a later stage, are of a higher quality using the presently disclosed method, since the slides are ideally free of artefacts. The method disclosed herein saves valuable time for the pathologist, since only artefact-free slides will be subject to a detailed analysis. Furthermore, the method according to the present disclosure minimizes the risk of misinterpretations leading to potentially false diagnoses.

The present disclosure further addresses the above-mentioned issues by presenting a method of training a deep learning model, e.g. a neural network, to recognize artefact information in one or more digital images of a section of a tissue specimen. The inventors have realized that a deep learning model can be trained to recognize artefacts, and that by using such a trained deep learning model in a process of automatic detection of artefacts at an early stage, such as in a preliminary imaging step performed outside a scanning system. If the preliminary imaging step is performed outside the scanning system, this step may be referred to as pre-scanning. The deep learning model may be trained to recognize different artefact types, such as tissue folds, glue, or holes in the tissue. Once the deep learning model is sufficiently trained, the present disclosure provides a method for the automatic detecting or identification of artefacts in histopathological images, thus providing a fast and reliable method of the identification of artefacts and subsequent evaluation of whether the histology slide should be rejected from further imaging and analysis.

A first embodiment relates to a method for preparing a plurality of histology slide images for analysis in an inline process, said method comprising, a) providing a histology slide with a tissue specimen, b) obtaining an image of at least a part of the tissue specimen on the slide using a first magnification, and c) based on said image, determining whether the slide with the tissue comprises one or more artefact(s) by using a deep learning model trained to recognize the one or more artefact(s), the one or more artefact(s) being an artificial structure or a tissue alteration on the slide as a result of an extraneous factor, d) based on the determination in c) and further based of a position and/or size of the one or more artefact(s), removing the slide from said inline process if the slide comprises a rejectable artefact, or if no rejectable artefacts are determined, classifying the slide as an accepted slide, e) obtaining a histology slide image of at least a part of the tissue specimen on the accepted slide using a second magnification, the second magnification being higher than the first magnification, and optionally obtaining (a) further histology slide image(s) of at least a part of the tissue specimen on the accepted slide using further higher magnification(s), f) repeating steps a)-e) for each histology slide, thereby preparing the plurality of histology slide images in the inline process. If an artefact is detected on the slide, the method may further determine whether the artefact has any impact on the diagnostic or research assessment. This can be done by analysing whether the position and/or size of the artefact means that the tissue cannot be examined in a relevant detail. In the present context, relevant detail means that structural and morphological details of the tissue can be identified from the image and that all or nearly all of the histopathological information present in the specimen can be inferred from the image. In case the artefact may have an impact on the diagnostic or research assessment, the artefact may be rejected A second embodiment relates to a method for analyzing a plurality of histology slides, the method comprising the steps of: providing a histology slide with a tissue specimen; obtaining an image of at least a part of the tissue specimen on the slide using a first magnification; determining whether the slide with the tissue comprises one or more artefacts; based on said determination removing the slide from the process if the slide comprises a rejectable artefact; or if no rejectable artefacts are determined classifying the slide as an accepted slide; obtaining an image of at least a part of the tissue specimen on the accepted slide using a second higher magnification; optionally obtaining further images of at least a part of the tissue specimen on the accepted slide using further higher magnifications; performing an analysis of at least a part of the images obtained from the accepted slides; repeating the above steps for each histology slide, thereby analyzing the plurality of the histology slides in the inline process. The second embodiment may perform the steps of c) determining whether the slide with the tissue comprises one or more artefact, d) removing or keeping the slide in the inline process, and e) obtaining a histology slide image of a higher magnification to be sent for further analysis, according to the first embodiment.

In one embodiment, the preliminary imaging step is performed outside a scanning system as shown in FIG. 2. The imaging may be done by any camera suitable for providing an overview image, preferably using a low magnification as described below. The overview image should be sufficiently clear to ensure that common artefacts are visible in the image, provided they are present in the specimen. The most common artefacts are typically tissue folds, glue, or holes in the tissue. In case artefacts are present in the specimen, it is preferably evaluated whether the artefacts may have an impact on any subsequent analyses. If this is the case, the artefacts are referred to as rejectable artefacts, and the slide should be rejected. A new tissue specimen may then optionally be prepared. In case the slide does not contain rejectable artefacts, the slide is passed on to an image acquisition step, typically performed by a scanner or scanning system. The scanner typically provides two imaging steps at multiple magnifications. Often, the first imaging is referred to as a low magnification, as discussed below. The second imaging is herein referred to as a high magnification imaging as discussed below. Subsequent to the image acquisition in the scanner, the slides and/or images are often stored for later analysis. Typically, the analysis is done by a pathologist and/or a lab technician, in some cases both. In the presently disclosed method, the analysis may also be done automatically by a computing system, e.g. a deep learning model such as a neural network.

In another embodiment, the preliminary imaging step is performed inside a scanning system as shown in FIG. 3. In this embodiment, the preliminary imaging is done using the camera/lens provided by the scanner. Based on the image obtained, preferably using a low magnification as described below it is evaluated whether any rejectable artefacts are present and whether the slide should be rejected. If no rejectable artefacts are present, the slide may proceed to further imaging, preferably using higher magnifications as described below. The remaining steps are identical to the previously discussed method outlined in FIG. 2.

The present disclosure further relates to a deep learning model, such as a convolutional neural network, a recurrent neural network or a general adversarial network, said model trained to obtain artefact information from an image of a section of a specimen.

The present disclosure further relates to a system for training a deep learning model, comprising a computer-readable storage device for storing instructions that, when executed by a processor, performs the presently disclosed method for training a deep learning model to obtain artefact information from images.

The present disclosure further relates to a system for analyzing a plurality of histology slides, comprising a computer-readable storage device for storing instructions that, when executed by a processor, performs the presently disclosed method.

DEFINITIONS

In the present context, an "inline process" or "in-line process" means the process from providing a histology slide with a tissue specimen to a slide holder to the final image analysis of the slide.

In the present context, an "early stage" is understood as a stage preferably before the diagnostic assessment of the tissue specimen.

In the present context, the terms "histology slide", "tissue slide" and "slide" are used interchangeably. In addition, the terms "tissue specimen" and "specimen" are used interchangeably.

An artefact is defined as an artificial structure or tissue alteration on a prepared microscopic slide as a result of an extraneous factor.

A rejectable artefact is defined as an artefact that may have an impact on the diagnostic assessment and/or research assessment (image analysis or/and manual analysis) of the tissue specimen.

DETAILED DESCRIPTION OF THE INVENTION

The present disclosure relates to a method for analyzing a plurality of histology slides in an inline process wherein it is possible to detect artefacts in the slide or tissue arranged on the slide at an early stage in the process.

Figure 1:
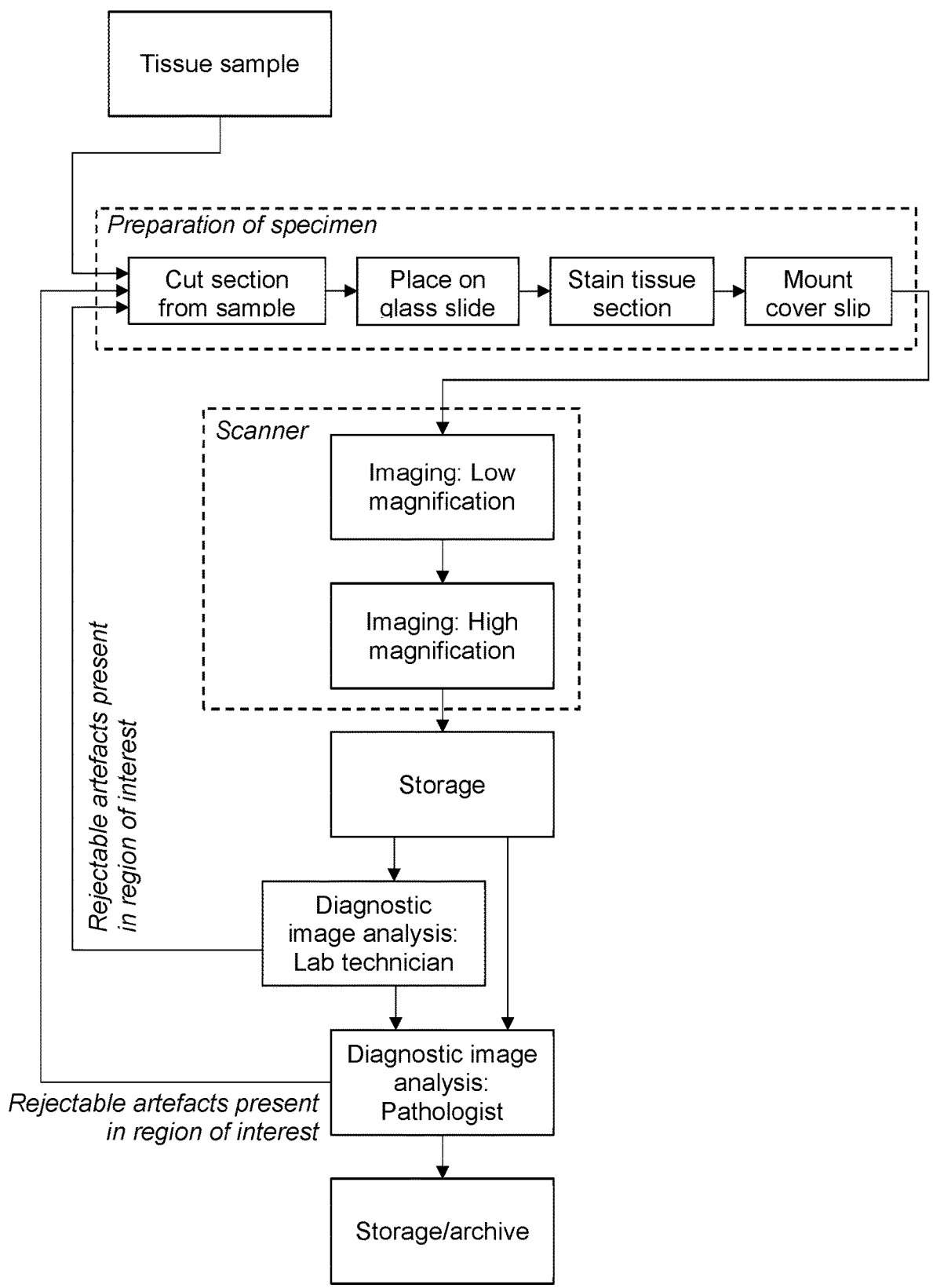
FIG. 1 displays a generic process of preparing a histology slide with a tissue specimen, acquiring images of the specimen, and subsequently analysing the images in accordance with the prior art. The process begins with the obtainment of a tissue sample. The tissue sample may come from any relevant tissue, often tissue suspected to contain tumor tissue. Then, a tissue specimen is prepared from the sample. First, a section containing from the sample is cut (sectioning), then the specimen is placed on a glass slide, the tissue is stained (using, for example, a H&E staining protocol), and a cover slip is mounted on top to secure the tissue specimen. The specimen is then ready for image acquisition. This may be done using an optical microscope or a scanner. In this example, the imaging is done using a scanner. First, the specimen is imaged using a low magnification as described below and then the specimen is imaged using a higher magnification as described below. The histology slides may optionally be stored for later image analysis. The final image analysis is typically performed by a lab technician and/or a pathologist; in some cases both. In case rejectable artefacts are present in the region of interest the images are useless, and a new specimen has to be cu t from the tissue sample. Due to the late detection of rejectable artefacts, a major part of the process flow has to be repeated, which is ineffective.

Normally, the process begins with the preparation of a tissue specimen obtained from a tissue sample. The tissue specimen may be prepared according to methods known in the prior art. The steps involved in the preparation of the tissue specimen is typically sectioning, mounting, staining, and placement of a cover slip as illustrated in FIG. 1. Once the specimen is mounted on a slide, typically with a cover slip on top, the inline process according to the present disclosure preferably begins with a preliminary image acquisition step. This step may be performed either outside a scanning system, e.g. using any suitable camera for acquiring a low magnification image, or it may be performed inside a scanning system using the camera provided by the scanner. The early imaging of the specimen serves the purpose of detecting possibly present artefacts in the specimen in order to evaluate whether the slide is of sufficient quality to proceed further in the process or if the slide should be rejected already at this point.

Based on the image(s) obtained at the early imaging step, a preliminary image analysis is then performed in which any possibly present artefacts are preferably detected and wherein it is assessed whether the artefacts constitute rejectable artefacts. In case there are rejectable artefacts present, the whole slide should preferably be rejected and a new specimen may optionally be prepared. The slide may be rejected and/or removed manually by a person, e.g. a pathologist, or it may be rejected and/or removed automatically by a system, e.g. a computer system. If no rejectable artefacts are present, the slide is referred to as an accepted slide, and it may proceed to further imaging, e.g. performed in a scanning system.

The accepted slides are then typically imaged at higher magnifications, e.g. using a digital scanner. In the scanner, an image of at least a part of the tissue specimen is optionally obtained using a first, low magnification. In one embodiment this step may be skipped in case the slide is imaged outside the scanning system using a similar magnification. Typically, further images of at least a part of the tissue specimen on the accepted slide are then subsequently obtained, often using further higher magnifications. The slides and images are then preferably stored for later analysis.

Subsequent to the image acquisition and/or storage, an analysis of at least a part of the images is preferably performed. This image analysis is also referred to as the diagnostic image analysis, and it may be performed by a histopathology expert, e.g. a pathologist, or a lab technician, or a computer implemented method, or combinations thereof. Ideally, the analysed slides are free of rejectable artefacts using the presently disclosed method.

The whole inline process as specified above may be repeated for each histology slide, thereby analysing the plurality of the histology slides in the inline process. Alternatively, the diagnostic image analysis of the images may be postponed until a plurality of histology slides have been processed up until the diagnostic image analysis step in the inline process. Since there normally is a large number of slides to be processed by said inline process, it is an advantage to sort the slides into acceptable slides and rejectable slides as early as possible, preferably at the preliminary imaging step, since the required time for both scanning and diagnostic image analysis scales proportionally with the number of slides to be analysed. Hence, the present disclosure related to a method for sorting histopathology slides into acceptable slides and rejectable slides.

Since the artefact is determined at an early stage, it is normally easy to replace the slide with another slide having a tissue specimen from the same sample. An early stage means that the acceptance/rejection of the slide is determined at a stage before the diagnostic image analysis. By replacing the rejected slide with another slide having a tissue specimen from the same sample, it is possible to provide relevant information about the sample; information which could have been conveyed by the rejected slide, had it not contained a rejectable artefact. By replacing the rejected slide at an early stage, time and money is possibly saved since the unusable slide is not subjected to further image acquisition and image analysis. Furthermore, the risk of misinterpretations or incorrect diagnoses on the basis of image analysis of the tissue specimen is reduced by removing the slides containing one or more rejectable artefacts prior to the diagnostic image analysis. Thereby, there is a smaller amount of useless slides to be scanned using the second, higher magnification, and there is a smaller amount of useless slides to be analysed during the diagnostic image analysis. Additionally, it is of interest to limit the amount of useless slides, i.e. slides having one or more rejectable artefacts, in order to limit costs related to storage.

The present disclosure further relates to a method for obtaining artefact information for assessing the quality of a histology slide, which may be used for training a deep learning model. The deep learning model may be a convolutional neural network, a recurrent neural network or a general adversarial network. In one embodiment, the method comprises the steps of providing a first image of a first section of a tissue specimen, wherein the first section comprises at least one artefact. Then, information about the artefact is obtained preferably using an image analysis software. The information could simply be "not suitable for diagnostic assessment" or could be related to the position of the artefact, the type of artefact, or other relevant information regarding the artefact. The artefact information may be considered to be the ground truth e.g. in relation to training the deep learning model. Annotation and labelling can be seen as indications in the images pointing out physical characteristics. The artefact information associated with the images is important for training the model sufficiently.

Figure 5:
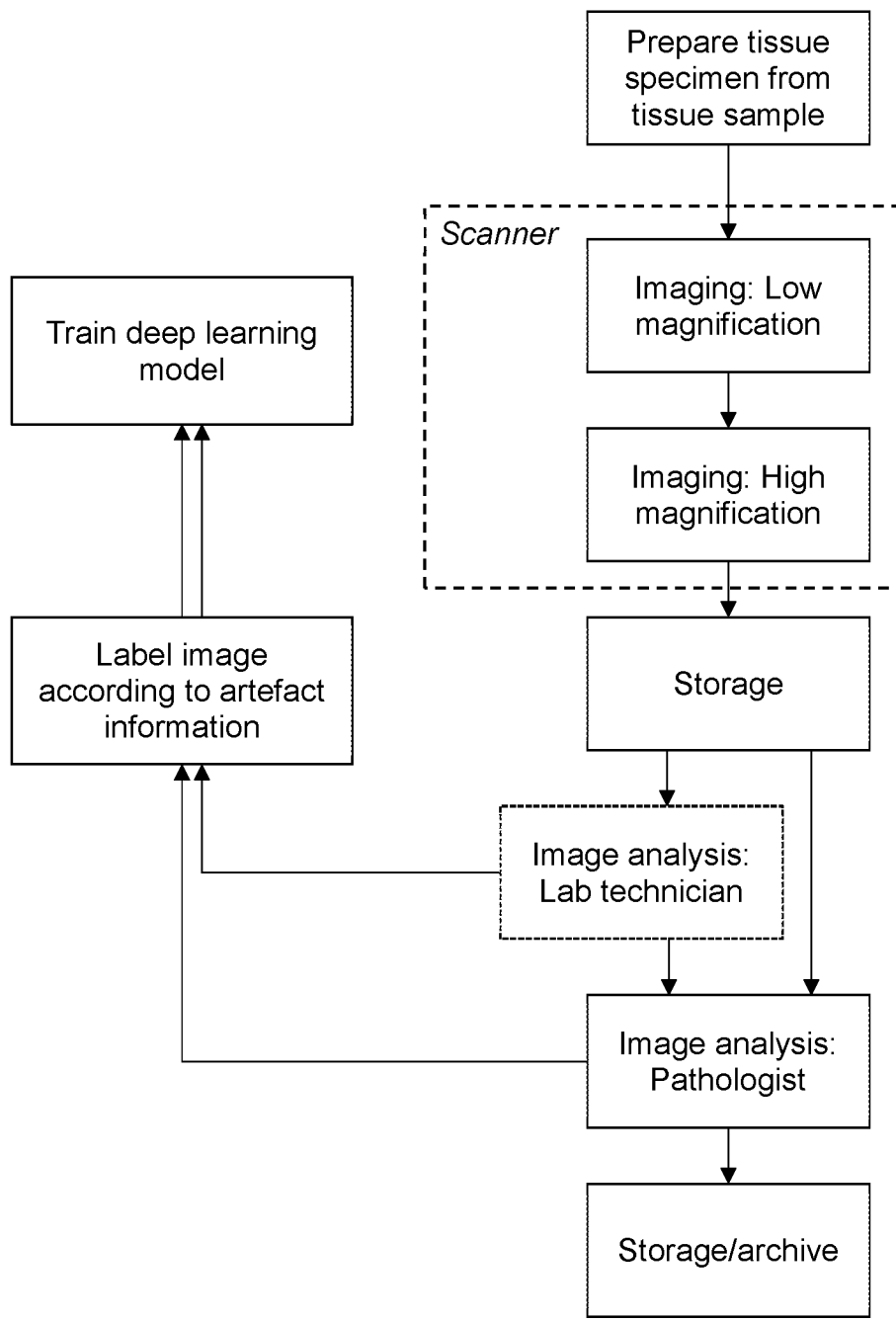
FIG. 5 displays a process of training a deep learning model according to an embodiment of the present invention. The process begins with the preparation of a tissue specimen from a tissue sample according to methods known in the prior art. A plurality of histology slides, each comprising a tissue specimen, are then imaged (e.g. using a scanner), preferably using two different magnifications, and stored for later analysis. The images are then analysed by a lab technician and/or a pathologist. At this point it is preferably discovered, which slides contain one or more rejectable artefacts. The images containing rejectable artefacts are then labelled according to the artefact information. The artefact information may simply be "not suitable for diagnostic assessment" or the artefact information may relate to the position and/or type of the artefact. The images are then provided to a deep learning model for training purposes.

In another embodiment of the present disclosure, the method for training the deep learning model is based on the sorting of histology slide into accepted slides and rejectable slides, wherein said sorting is performed by a human expert, e.g. a pathologist and/or lab technician (cf. FIG. 5). By inputting a plurality of images to a deep learning model, said images containing rejectable artefacts, the model becomes increasingly better at understanding what constitutes a rejectable artefact. After a sufficient number of images has been input to the model, such as about 100 to about 1000 images, typically from about 500 to 1000 images, the deep learning model may be considered skilled enough that the training is complete. Hereafter, the model will be capable of recognizing artefacts in histopathological images, and accordingly the identification of artefacts and the corresponding sorting of slides may be done automatically by a computer system.

The present disclosure further relates to a method for training a deep learning model, of any of the above-mentioned types, wherein the training of the deep learning model is based on training annotations associated with the first image, and wherein results of the training annotations are compared against the artefact information of the first image.

The present disclosure further relates to a system for described training process. One embodiment of such a system comprises a computer-readable storage device for storing instructions that, when executed by a processor, performs the method for identifying artefact information from images and/or the method for training a deep learning model to obtain artefact information from images. The present disclosure further relates to a computer program, a computer-readable medium, or a computer-readable storage device having instructions thereon which when executed by a computing device or system causes the computing device or system to perform identification of artefact information from one or more images and/or the method for training a deep learning model.

Preliminary Imaging

The preliminary imaging step provides an image suitable for revealing whether the slide comprises an artefact that renders the slide unsuitable for diagnostic assessment, i.e. a rejectable artefact.

The preliminary imaging step is conducted using a first magnification. In the present context a first magnification is to be understood as the same as a low magnification or a first low magnification. It has been found that using a low magnification such as less than 5× preferably less than 2.5×, or even more preferably around or below 1× is a suitable first magnification, such as from about 0.1× to about 0.5×. The latter "first magnifications" may also be expressed in number of pixels capturing a slide, such as at least 200 pixels capturing the length of the slide, more preferable at least 1000 pixels capturing the length of the slide.

In one embodiment of the present disclosure, the preliminary imaging step is done outside a scanning system (cf. FIG. 2), e.g. using a standard camera/lens/microscope capable of providing the low magnification image. The advantages of this embodiment is that the slides to be rejected do not have to enter the scanner, but may be directed to another location. In another embodiment, the preliminary imaging step is done inside the scanning system (cf. FIG. 3), i.e. using the camera provided by the scanner yet still using a low magnification image for determining whether the slide is suitable for diagnostic assessment or alternatively should be rejected.

A low magnification image may also be obtained through obtaining a high magnification image obtained in a scanner and then coalescing neighbouring pixels in order to obtain a suitable overview image similar to a low magnification image. In the present context such an image is also called a low magnification image.

Scanner

The scanner may be any digital slide scanner or scan system suitable for acquiring one or more images of the tissue specimen arranged on the slide. The scanner is particularly useful for obtaining a higher magnification image. In the present context a "second magnification" or "high(er)" magnification means the same, namely a magnification from about 20×, more preferable from about 40×, such as about 100×.

Artefacts

An artefact can be defined as an artificial structure or tissue alteration on a prepared microscopic slide as a result of an extraneous factor. It is desired to detect an artefact as early as possible in order to be able to replace or reject the slide with an artefact before a detailed image analysis of the slide is performed.

The artefacts may occur during surgical removal, fixation, tissue processing, embedding, microtomy, staining, or mounting procedures. The artefacts detected are typically artefacts selected from the group consisting of dust, tissue folds, glue, broken glass, stain spots, erroneous cutting thickness, missing tissue, holes in tissue, erroneous pen/marker spots. Often the artefacts are either tissue folds, glue, or holes in the tissue.

Rejectable Artefacts

If an artefact is detected on the slide, it is normally further determined whether the artefact has any impact on the diagnostic or research assessment, i.e. whether the position and/or size of the artefact means that the tissue cannot be examined in a relevant detail. In the present context, relevant detail means that structural and morphological details of the tissue can be identified from the image and that all or nearly all of the histopathological information present in the specimen can be inferred from the image. The deep learning model may be trained to recognize different artefact types, such as tissue folds, glue, or holes in the tissue. This information may be used in combination with the position and/or size of the artefact to determine if the slide should be removed from the inline process.

In case the artefact may have an impact on the diagnostic or research assessment, the artefact is classified as a rejectable artefact and the slide should be rejected from further analysis, i.e. the slide should be removed from the inline process.

Rejected Slides

Rejected slides should preferably be removed from the in-line process as soon as possible, preferable right after the determination that the slide is rejected.

The slide may be removed manually; however it is preferred that the slide is removed automatically. Every time a slide is removed a notice should be given to signal that the slide is rejected so that a new slide may be provided to replace the rejected slide. The notice may be any suitable type of notice. For example the person in charge of the slides may be provided with a list of rejected slides from the batch of slides in the in-line process.

Sectioning

Sectioning of tissue may be performed using any technique and additionally involve any type of tissue processing. Typically, whole tissues are cut into ultrathin sections that are stained using staining protocol and staining markers. Specimens are typically sliced at a range of 3 μm-50 μm.

Specimen

The specimen may be any suitable specimen containing biological cells, e.g. human tissue, animal tissue, plant tissue, and/or mineralized tissue. The tissue specimen could for instance include a plurality of human cells. The plurality of human cells could potentially include one or more human cancer cells. Mostly the specimen is either a section of a tissue portion or a sample of fluid containing cells.

The tissue portion may come from any relevant tissue, and may come from tumor tissue or tissue suspected to contain tumor tissue. It may be any tumor, such as typically tumor tissue selected from breast tumor tissue, colon tumor tissue, bladder tumor tissue, kidney tumor tissue, endometrial tumor tissue, lung tumor tissue, melanoma tissue, and prostate tumor.

The specimen may also be a sample of fluid containing cells. The fluid may be a body fluid, such as blood, urine, saliva or cerebrospinal fluid, or the fluid may come from a lavage, such as bronchoalveolar lavage. The fluid may be examined for any type of cells, such as cancer cells.

The tissue specimen may include one or more anatomical structures such as the outer shape of the tissue specimen, vascular structure(s), nerve structure(s), muscle structure(s), cell membrane(s), space(s) in the section, cell(s), an alveolus, particle(s) or a nucleus.

Staining

The staining may be any staining used in laboratories for staining specimens containing cells, such as tissue sections or fluid specimens.

Typically, the staining is a staining specific for a marker in said specimen, such as a marker for protein expression, for example a protein expression specific for a specific type of cells in the specimen. An example is a staining for a marker associated with the cell membrane. Another example is a staining for the cell nucleus. The specific staining could be a specific immunohistochemistry staining. The staining could also be a non-specific staining, such as hematoxylin and eosin staining.

Automated System and Software

In another aspect, the present invention further encompasses an automated or semi-automated system suitable for carrying out one or more of the methods disclosed herein, said automated or semi-automated system comprising, in combination: a database capable of including a plurality of images of the specimens; a software module for analyzing an image of the specimen;

a control module comprising instructions for carrying out said method(s).

Said automated or semi-automated system can also further comprise a scanner and a view screen, and/or a microscope and a camera.

Using a fully automated microscope, it is possible to let the system switch between low and high magnification. By using low magnification, it is possible to obtain a "superlens" representation providing an overview of the entire slide, and let the system automatically identify regions on the slide containing tissue, using image analysis.

The system may further include a general processor and peripherals for printing, storage, etc. The general processor can be a microprocessor based microcomputer, although it may be another computer-type device suitable for efficient execution of the functions described herein. The general processor can for example control the functioning and the flow of data between components of the device, and handles the storage of representation and classification information. The general processor can additionally control peripheral devices such as a printer, a storage device, such as an optical or magnetic hard disk, a tape drive, etc., as well as other devices including a bar code reader, a slide marker, autofocus circuitry, a robotic slide handler, the stage, and a mouse.

Preferably, the images obtained are monochrome representations, color representations, or multi-frame (e.g. multispectral) images. Images are preferably stored as TIFF representations, or as JPEG or other standard formats.

In another embodiment the image may be acquired from a virtual slide obtained by means of a virtual microscope imaging the cell specimen in question. In this embodiment, the entire tissue area has been scanned at high magnification in e.g. a virtual slide scanner, and the resulting representation is already stored, for example on the hard disk drive. The system now handles this large representation as if it was controlling a microscope, stage, camera etc. Thus, the user can use the exact same interface to work with virtual microscope representations as when working with an actual microscope.

Computer Readable Medium or Software

In another aspect, the present invention further encompasses a computer readable medium or software program comprising instructions for carrying out one or more of the methods disclosed herein. Suitable computer-readable media can for example be a hard disk to provide storage of data, data structures, computer-executable instructions, and the like. Other types of media which are readable by a computer, such as removable magnetic disks, CDs, magnetic cassettes, flash memory cards, digital video disks, and the like, may also be used.

EXAMPLE

An example of a digital scanner could be any of the Nanozoomer scanners from the company Hamamatsu, e.g. the Nanozoomer SQ, the Nanozoomer S60, the Nanozoomer S210, or the Nanozoomer S360.

Figure 2:
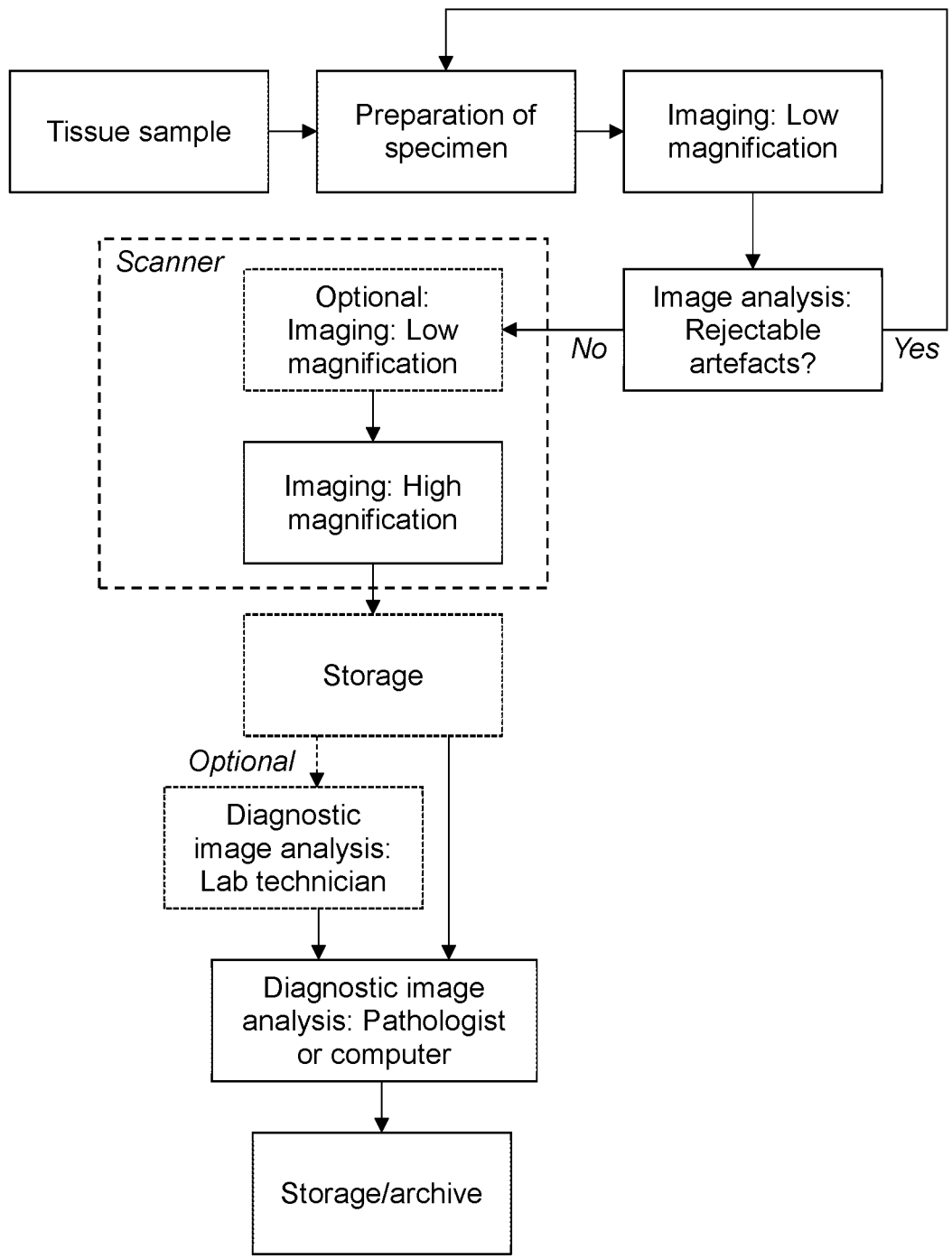
FIG. 2 displays a process of providing a tissue specimen to a scanner for image acquisition and subsequent image analysis according to an embodiment of the present disclosure. This process features a preliminary image acquisition and image analysis step with the aim of identifying any rejectable artefacts present in the specimen. A rejectable artefact is herein understood as an artefact that may have an impact on the image analysis. In this embodiment, the preliminary imaging is done outside the scanner, e.g. using a camera or microscope suitable for acquiring an overview image of the specimen, typically using a low magnification as described below. The overview image should be suitable for identifying at least some artefacts if any are present. In case the slide does not contain any rejectable artefacts, the slide is referred to as an accepted slide, and it may proceed to further imaging. If the slide is rejected, a new specimen has to be obtained. The above-described method has the benefit that rejectable slides are identified at an early stage in the process. They can then be removed from the process rather than being subject to further imaging steps in the scanner, and further image analysis by histopathology experts. Accordingly, by removing slides containing rejectable artefacts, valuable resources are saved and the risk of false interpretations from the sample is reduced.

An example of a method for analysing a plurality of histology slides according to the present disclosure is shown in FIG. 2. In this example, the slides are analysed outside the scanner in order to evaluate whether each slide should be accepted or rejected. The imaging may be done by any camera capable of acquiring a low magnification image.

Figure 3:
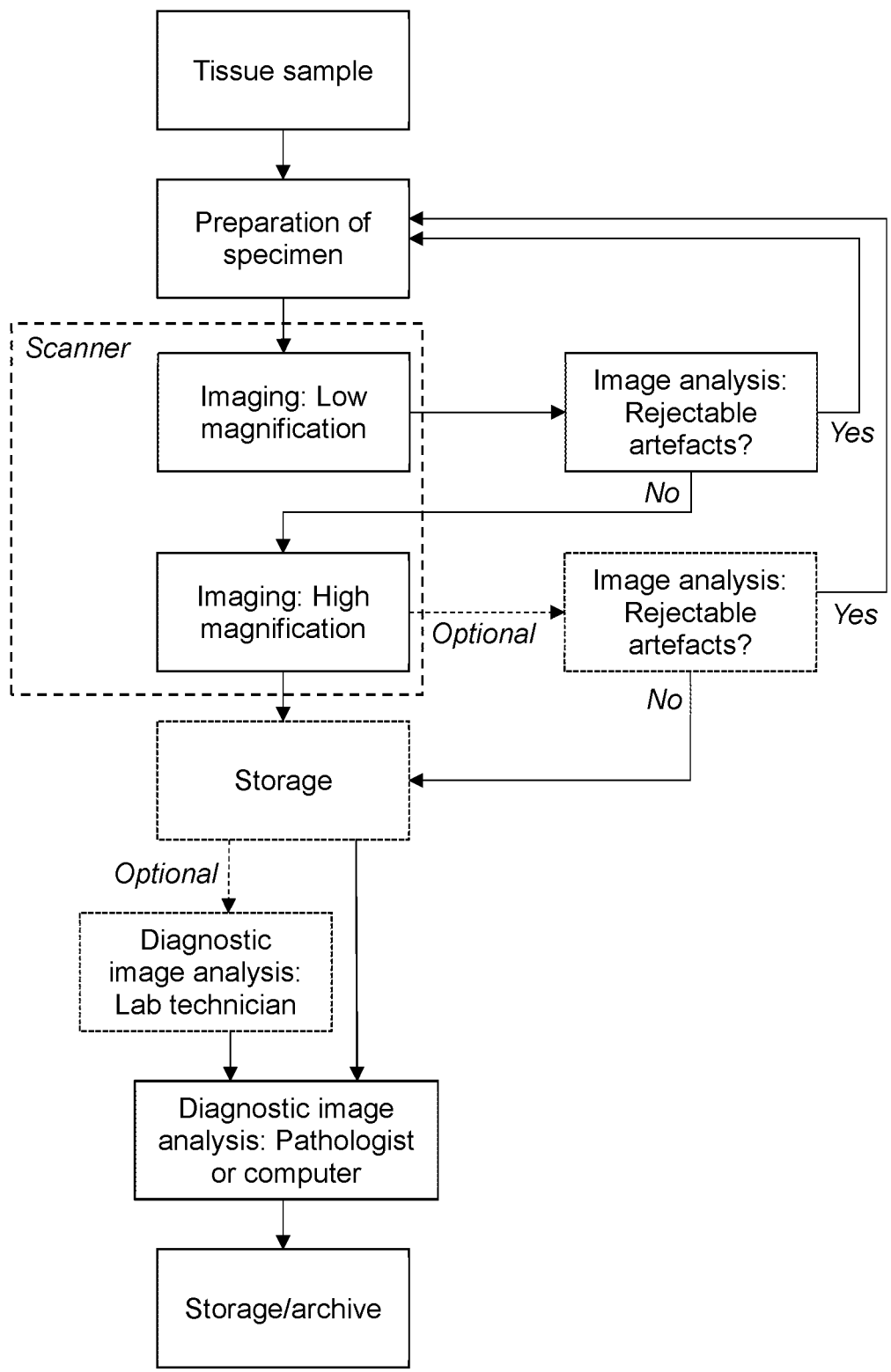
FIG. 3 displays a similar process of analysing histology slides according to another embodiment of the present invention. Similar to the process outlined in FIG. 2, this process features a preliminary image analysis step, wherein it is evaluated whether the specimen contains any rejectable artefacts. Contrary to the process of FIG. 2, this step is performed inside the scanning system, using the lens/camera provided by the scanner. Preferably, the image acquired is an image of low magnification, since it allows for faster imaging and since a large part of rejectable artefacts are visible at low magnifications (e.g. 2.5× or 1×). If the specimen contains rejectable artefacts, the slide is rejected, and another specimen has to be prepared. Subsequent to the preliminary image analysis step, the slides are further imaged at a higher magnifications (typically 20× or 40×). A plurality of slides will typically be processed sequentially in the scanner and stored after imaging. Finally, a more detailed image analysis may be performed by a lab technician and/or a pathologist, before the histology slides and/or images are stored/archived again.
Figure 4:
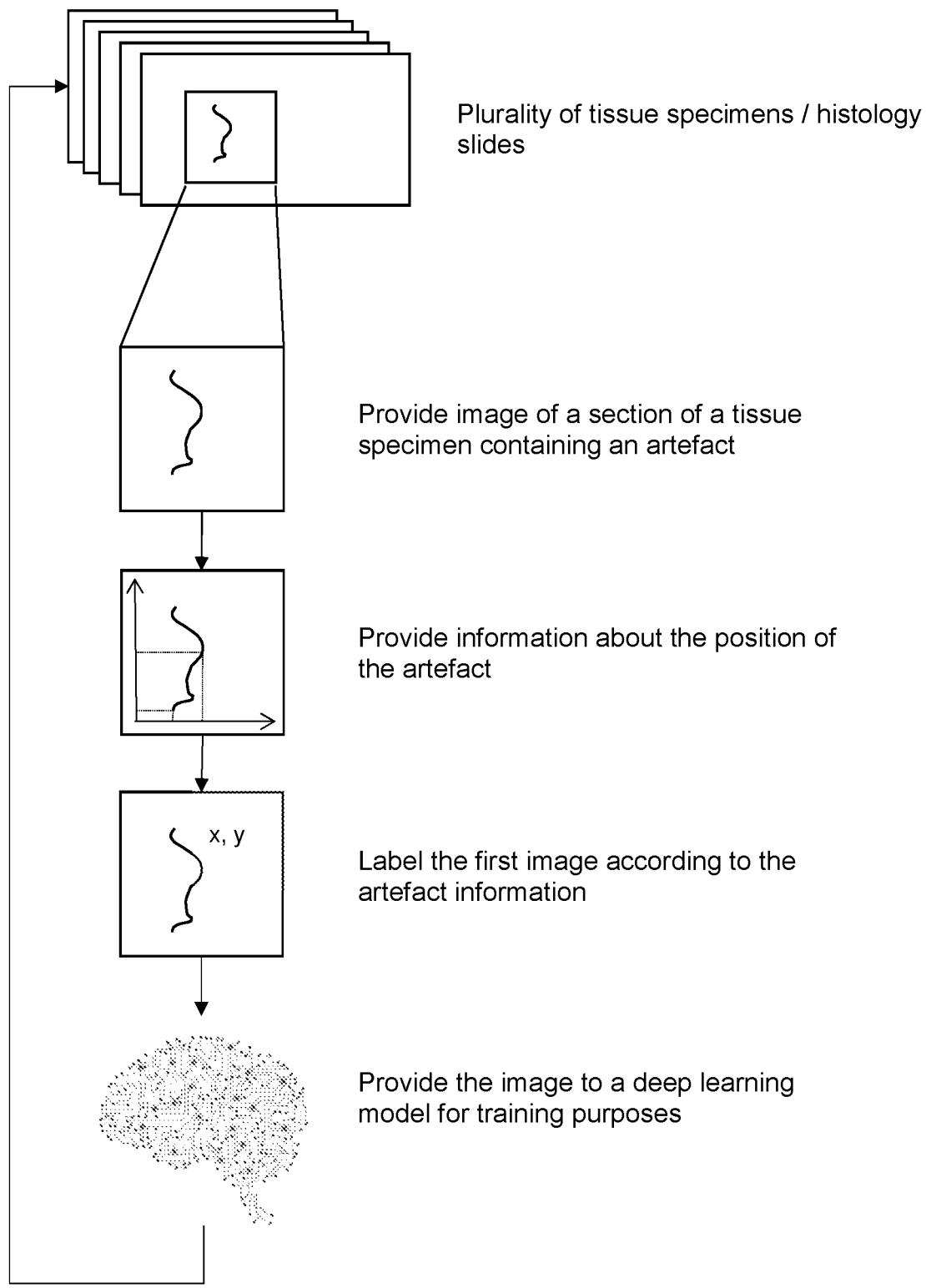
FIG. 4 displays an example of a process of training a deep learning model according to an embodiment of the present invention. The process begins with selecting, from a plurality of images of tissue specimens, an image containing an artefact. Then, information about the artefact is retrieved, e.g. the position of the artefact, using an image analysis software. Subsequently, the information is transferred to the image, i.e. the image is labelled according to the artefact information. Then, the labelled image is presented to a deep learning model to train the model to recognise artefacts in images. The process is optionally repeated any number of times, each time using a another image, e.g. using from 100 to 1000 images, normally from 500 to 1000 images, before the deep learning model is sufficiently trained.

An example of a method for analysing a plurality of histology slides according to the present disclosure is shown in FIG. 3. In this example, the evaluation relating to rejectable artefacts is based on an image obtained inside the scanner, i.e. using the camera/lens provided by the scanner.

FURTHER DETAILS OF THE INVENTION

1. A method for preparing a plurality of histology slides for analysis in an inline process, said method comprising,
   a) providing a histology slide with a tissue specimen,
   b) obtaining an image of at least a part of the tissue specimen on the slide using a first magnification, and
   c) based on said image determining whether the slide with the tissue comprises one or more artefact(s),
   d) based on the determination in c) removing the slide from said inline process if the slide comprises a rejectable artefact, or if no rejectable artefacts are determined classifying the slide as an accepted slide,
   e) obtaining an image of at least a part of the tissue specimen on the accepted slide using a second higher magnification, and optionally obtaining (a) further image(s) of at least a part of the tissue specimen on the accepted slide using further higher magnification(s),
   f) repeating steps a)-e) for each histology slide, thereby preparing the plurality of the histology slides in the inline process.

2. A method for analyzing a plurality of histology slides in an inline process, said method comprising,
   a) providing a histology slide with a tissue specimen,
   b) obtaining an image of at least a part of the tissue specimen on the slide using a first magnification, and
   c) based on said image determining whether the slide with the tissue comprises one or more artefact(s),
   d) based on the determination in c) removing the slide from said inline process if the slide comprises a rejectable artefact, or if no rejectable artefacts are determined classifying the slide as an accepted slide,
   e) obtaining an image of at least a part of the tissue specimen on the accepted slide using a second higher magnification, and optionally obtaining (a) further image(s) of at least a part of the tissue specimen on the accepted slide using further higher magnification(s),
   f) performing an image analysis of at least a part of the images obtained from the accepted slides,
   g) repeating steps a)-f) for each histology slide, thereby analyzing the plurality of the histology slides in the inline process.

3. The method according to item 1 or 2, wherein the removal of a rejectable slide is performed automatically.

4. The method according to item 2, wherein the steps a)-e) are performed for all histology slides before step f) is performed.

5. The method according to any of the preceding items, wherein the tissue is stained with a non-specific staining, such as hematoxylin and eosin staining.

6. The method according to any of the preceding items, wherein the tissue is stained with a specific staining, such as specific immunohistochemistry staining.

7. The method according to any of the preceding items, wherein the first magnification is below 5×, such as less than 2.5×, or around or below 1×, such as from about 0.1× to about 0.5×.

8. The method according to any of the preceding items, wherein the second magnification is from about 20× to about 100×.

9. The method according to any of the preceding items, wherein the artefact is selected from the group selected from the group of dust, tissue folds, glue, broken glass, stain spots, erroneous cutting thickness, missing tissue, holes in tissue, erroneous pen/marker spots.

10. The method according to any of the preceding items, wherein the tissue specimen is selected from the group of tissues of human tissues, animal tissues, plant tissues, or mineralized tissues.

11. The method according to any of the preceding items, wherein the tissue specimen includes a plurality of human cells.

12. The method according to item 11, wherein the plurality of human cells includes one or more human cancer cells.

13. The method according to any of the preceding items, wherein the tissue specimen includes one or more anatomical structures selected from the group consisting of: the outer shape of the tissue specimen, vascular structure(s), nerve structure(s), muscle structure(s), cell membrane(s), space(s) in the section, cell(s), an alveolus, particle(s) or a nucleus.

14. The method according to any of the preceding items, further comprising use of a computer readable medium having stored therein instructions for causing one or more processors to execute the steps of the method.

15. A method for training a deep learning model for assessing the quality of a histology slide, the method comprising the steps of:
   a) providing images of a plurality of tissue specimens, each specimen being arranged on a histology slide, wherein said histology slides each comprising of at least one artefact;
   b) providing information about the artefact in each images,
   c) training a deep learning model, based on image(s) and related artefact information.

16. The method according to item 15, wherein the deep learning model is trained to recognize an artefact as defined in any of the items 1-14.

17. The method according to any of the preceding items 15-16, wherein the training of the deep learning model is based on training annotations associated with the first image, and wherein results of the training annotations are compared against the artefact information of the first image.

18. The method according to any of the preceding items 15-17, wherein the deep learning model is trained to recognize artefact information in hematoxylin and eosin stained images.

19. A deep learning model, such as a convolutional neural network, a recurrent neural network or a general adversarial network, said model trained to obtain artefact information from an image of a section of a specimen as defined in any of items 15-18.

20. A system for training a deep learning model, comprising a computer-readable storage device for storing instructions that, when executed by a processor, performs any of the methods according to items 15-18 for training a deep learning model to obtain artefact information from images.

21. A system for analyzing a plurality of histology slides, comprising a computer-readable storage device for storing instructions that, when executed by a processor, performs any of the methods according to items 1-14.

22. The system according to item 21, comprising means for automatically rejecting slides comprising a rejectable artefact.

23. The system according to item 21 or 22, wherein the first magnification image is obtained by a camera outside the scanner.

24. A scanner for use in a method according to items 1-14, comprising means for automatically rejecting slides comprising a rejectable artefact.

The invention claimed is:

1. A method for preparing a plurality of histology slide images for analysis in an inline process, said method comprising:
   a) providing a histology slide with a tissue specimen,
   b) obtaining an image of at least a part of the tissue specimen on the slide using a first magnification;
   c) based on said image, determining whether the slide with the tissue comprises one or more artefact(s) by using a deep learning model trained to recognize the one or more artefact(s), the one or more artefact(s) being an artificial structure or a tissue alteration on the slide as a result of an extraneous factor;
   d) based on the determination in c) and further based of a position and/or size of the one or more artefact(s), removing the slide from said inline process if the slide comprises a rejectable artefact, or if no rejectable artefacts are determined, classifying the slide as an accepted slide;
   e) obtaining a histology slide image of at least a part of the tissue specimen on the accepted slide using a second magnification, the second magnification being higher than the first magnification, and optionally obtaining (a) further histology slide image(s) of at least a part of the tissue specimen on the accepted slide using further higher magnification(s); and
   f) repeating steps a)-e) for each histology slide, thereby preparing the plurality of histology slide images in the inline process.

2. The method according to claim 1, wherein the removal of a rejectable slide is performed automatically.

3. The method according to claim 1, wherein the one or more artefacts are selected from the group consisting of dust, tissue folds, glue, broken glass, stain spots, erroneous cutting thickness, missing tissue, holes in tissue, erroneous pen/marker spots.

4. The method according to claim 1, wherein the deep learning model is trained to recognize different artefact types, such as tissue folds, glue, or holes in the tissue.

5. The method according to claim 1, wherein the first magnification is below 5×, or less than 2.5×, or around or below 1×, or from about 0.1×to about 0.5X.

6. A system for analyzing a plurality of histology slides, comprising a computer-readable storage device for storing instructions that, when executed by a processor, performs the method according to claim 1.

7. A method for analyzing a plurality of histology slides in an inline process, said method comprising:
   a) providing a histology slide with a tissue specimen;
   b) obtaining an image of at least a part of the tissue specimen on the slide using a first magnification;
   c) based on said image, determining whether the slide with the tissue comprises one or more artefact(s) by using a deep learning model trained to recognize the one or more artefact(s), the one or more artefact(s) being an artificial structure or a tissue alteration on the slide as a result of an extraneous factor;
   d) based on the determination in c) and further based of a position and/or size of the one or more artefact(s), removing the slide from said inline process if the slide comprises a rejectable artefact, or if no rejectable artefacts are determined classifying the slide as an accepted slide;
   e) obtaining a histology slide image of at least a part of the tissue specimen on the accepted slide using a second magnification, the second magnification being higher than the first magnification, and optionally obtaining (a) further histology slide image(s) of at least a part of the tissue specimen on the accepted slide using further higher magnification(s);
   f) performing an image analysis of at least a part of the histology slide images obtained from the accepted slides; and
   g) repeating steps a)-f) for each histology slide, thereby analyzing the plurality of the histology slides in the inline process.

8. The method according to claim 7, wherein the steps a)-e) are performed for all histology slides before step f) is performed.

* * * * *